United States Patent
D'Souza

(10) Patent No.: US 10,891,120 B2
(45) Date of Patent: *Jan. 12, 2021

(54) PERFORMING A COMPILER OPTIMIZATION PASS AS A TRANSACTION

(71) Applicant: International Business Machines Corporation, Armonk, NY (US)

(72) Inventor: Irwin D'Souza, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/276,006

(22) Filed: Feb. 14, 2019

(65) Prior Publication Data

US 2019/0179622 A1 Jun. 13, 2019

Related U.S. Application Data

(63) Continuation of application No. 15/785,620, filed on Oct. 17, 2017, now Pat. No. 10,289,395.

(51) Int. Cl.
*G06F 8/41* (2018.01)
*G06F 9/445* (2018.01)
*G06F 9/455* (2018.01)
*G06F 9/46* (2006.01)

(52) U.S. Cl.
CPC .......... *G06F 8/48* (2013.01); *G06F 8/443* (2013.01); *G06F 9/44589* (2013.01); *G06F 9/45504* (2013.01); *G06F 9/466* (2013.01)

(58) Field of Classification Search
None
See application file for complete search history.

(56) References Cited

U.S. PATENT DOCUMENTS

| | | | |
|---|---|---|---|
| 8,225,074 B2 | 7/2012 | Chakradhar et al. |
| 8,819,649 B2 | 8/2014 | Lafreniere et al. |
| 8,930,926 B2 | 1/2015 | Bastoul et al. |
| 9,223,571 B2 | 12/2015 | Mitra et al. |
| 2011/0047534 A1 | 2/2011 | Ye et al. |

(Continued)

OTHER PUBLICATIONS

Appendix P, "List of IBM Patents or Patent Applications Treated as Related", Mar. 26, 2020, 2 pages.

(Continued)

*Primary Examiner* — Daxin Wu
(74) *Attorney, Agent, or Firm* — William H. Hartwell; Hunter E. Webb; Keohane & D'Alessandro, PLLC

(57) ABSTRACT

Embodiments described herein provide a solution for optimizing a compiling of program code. A proposed state pointer, which corresponds to a current state pointer to a current state node that represents a section of the program code, is added in an intermediate language (IL) representation of the program code. When the optimizing compiler determines that an optimization should be made to a section of code, the current state node is copied to create a proposed state node, which is then referenced by the proposed state pointer. The proposed state node is edited to include the optimization while the current state node remains unchanged. The success of the optimization is evaluated, and an updated IL representation is generated in which any references to nodes that are no longer included in the flow of the former IL representation are removed.

20 Claims, 11 Drawing Sheets

(56) References Cited

U.S. PATENT DOCUMENTS

| | | | |
|---|---|---|---|
| 2013/0055224 A1 | 2/2013 | Ravi et al. | |
| 2014/0019949 A1* | 1/2014 | Craymer | G06F 8/443 717/150 |
| 2014/0047416 A1* | 2/2014 | Pizlo | G06F 11/3452 717/128 |
| 2014/0223419 A1 | 8/2014 | Sakai | |
| 2015/0067225 A1 | 3/2015 | Ravi et al. | |
| 2015/0089484 A1 | 3/2015 | Halambi et al. | |
| 2015/0277877 A1 | 10/2015 | Feng et al. | |
| 2016/0019039 A1 | 1/2016 | Halambi et al. | |
| 2017/0177664 A1 | 6/2017 | Ma et al. | |

OTHER PUBLICATIONS

Seyong Lee et al., "OpenMP to GPGPU: A Compiler Framework for Automatic Translation and Optimization", PPoPP'09, Copyright 2009 ACM, 10 pages.

Yanlong Zhai et al., "Lit: A High Performance Massive Data Computing Framework Based on CPU/GPU Cluster", Copyright 2013 IEEE, 8 pages.

Thomas B. Jablin et al., "Automatic CPU-GPU Communication Management and Optimization", Copyright 2011 ACM, 10 pages.

P. Baldan et al., "Towards a Notion of Transaction in Graph Rewriting", Copyright 2008 Elsevier B.V., 12 pages.

Leszek Kotulski et al., "Transactional Model of Graph Transformations in Computer Aided Design", Scientifc.Net, Sep. 2013, 3 pages.

Luciana Foss, "Transactional Graph Transformation Systems", Jul. 2008, 123 pages.

Daxin Wu, USPTO Office Action, U.S. Appl. No. 15/785,620, dated Jul. 23, 2018, 18 pages.

Daxin Wu, USPTO Notice of Allowance and Fee(s) Due, U.S. Appl. No. 15/785,620, dated Jan. 3, 2019, 8 pages.

* cited by examiner

PERFORMING A COMPILER OPTIMIZATION PASS AS A TRANSACTION

CROSS-REFERENCE TO RELATED APPLICATIONS

The present patent document is a continuation of U.S. patent application Ser. No. 15/785,620 filed Oct. 17, 2017, entitled "PERFORMING A COMPILER OPTIMIZATION PASS AS A TRANSACTION", the disclosure of which is incorporated herein by reference.

TECHNICAL FIELD

This invention relates generally to compiling of program code. More specifically, this invention is drawn to transaction-based optimized compiling of program code.

BACKGROUND

In the networked computing environment of today, processes that can run in a number of different environments are becoming increasingly more sought after. One solution for facilitating these types of processes is a process virtual machine. A process virtual machine is generally understood to be a platform dependent engine that executes platform independent code written in a high-level programming language for performing a specific task. Thus, the same code (which can be written in any of a number of different programming languages) can be executed on many different platforms by utilizing a Java Virtual Machine (JVM) that is designed for each platform. One example of a process virtual machine is the JVM used in the JAVA environment (Java and Java Virtual Machine are trademarks of Sun Microsystems in the United States and/or elsewhere), although other implementations are also available. In any case, program code to be executed on process virtual machines (e.g., JVM) is generally not compiled entirely prior to execution of the code (also known as static compilation). Instead, at least a portion of the compiling is instead usually performed at run time (referred to just in time (JIT) compilation).

An optimizing compiler is one that not only compiles program code but optimizes it as it compiles so that it can run more efficiently. In most cases, the optimizing compiler does so by creating an Intermediate Language (IL) representation of the code, often in the format of a graph. This graph usually has a series of nodes, which represent functional processes of the code, joined by pointers. The optimizing compiler may perform several optimization passes over its IL representation, taking the IL representation as input and outputting a changed IL representation (e.g., with additions of, deletions of, and/or changes to nodes, pointers, metadata, and/or the like) that is functionally equivalent but better optimized (by some metric).

SUMMARY

In general, embodiments described herein provide a solution for optimizing a compiling of program code. A proposed state pointer, which corresponds to a current state pointer to a current state node that represents a section of the program code, is added in an intermediate language (IL) representation of the program code. When the optimizing compiler determines that an optimization should be made to a section of code, the current state node is copied to create a proposed state node, which is then referenced by the proposed state pointer. The proposed state node is edited to include the optimization while the current state node remains unchanged. The success of the optimization is evaluated, and an updated IL representation is generated in which any references to nodes that are no longer included in the flow of the former IL representation are removed.

One aspect of the present invention includes a method for optimizing a compiling of program code, comprising: adding a proposed state pointer corresponding to a current state pointer to a current state node that represents a section of the program code in an intermediate language (IL) representation of the program code; creating, in response to a determination by an optimizing compiler to make an optimization to the section of code, a proposed state node that is referenced by the proposed state pointer, the proposed state node being a copy of the current state node; editing the proposed state node to includes the optimization, wherein the current state node remains unchanged; evaluating whether the optimization is successful; and removing references to nodes that are no longer in the IL representation based on the evaluating to get an updated IL representation.

Another aspect of the present invention includes a computer system for optimizing a compiling of program code, the computer system comprising: a memory medium comprising instructions; a bus coupled to the memory medium; and a processor coupled to the bus that when executing the instructions causes the system to: add a proposed state pointer corresponding to a current state pointer to a current state node that represents a section of the program code in an intermediate language (IL) representation of the program code; create, in response to a determination by an optimizing compiler to make an optimization to the section of code, a proposed state node that is referenced by the proposed state pointer, the proposed state node being a copy of the current state node; edit the proposed state node to includes the optimization, wherein the current state node remains unchanged; evaluate whether the optimization is successful; and remove references to nodes that are no longer in the IL representation based on the evaluating to get an updated IL representation.

Yet another aspect of the present invention includes a computer program product for optimizing a compiling of program code, the computer program product comprising a computer readable storage device, and program instructions stored on the computer readable storage device, to: add a proposed state pointer corresponding to a current state pointer to a current state node that represents a section of the program code in an intermediate language (IL) representation of the program code; create, in response to a determination by an optimizing compiler to make an optimization to the section of code, a proposed state node that is referenced by the proposed state pointer, the proposed state node being a copy of the current state node; edit the proposed state node to includes the optimization, wherein the current state node remains unchanged; evaluate whether the optimization is successful; and remove references to nodes that are no longer in the IL representation based on the evaluating to get an updated IL representation.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
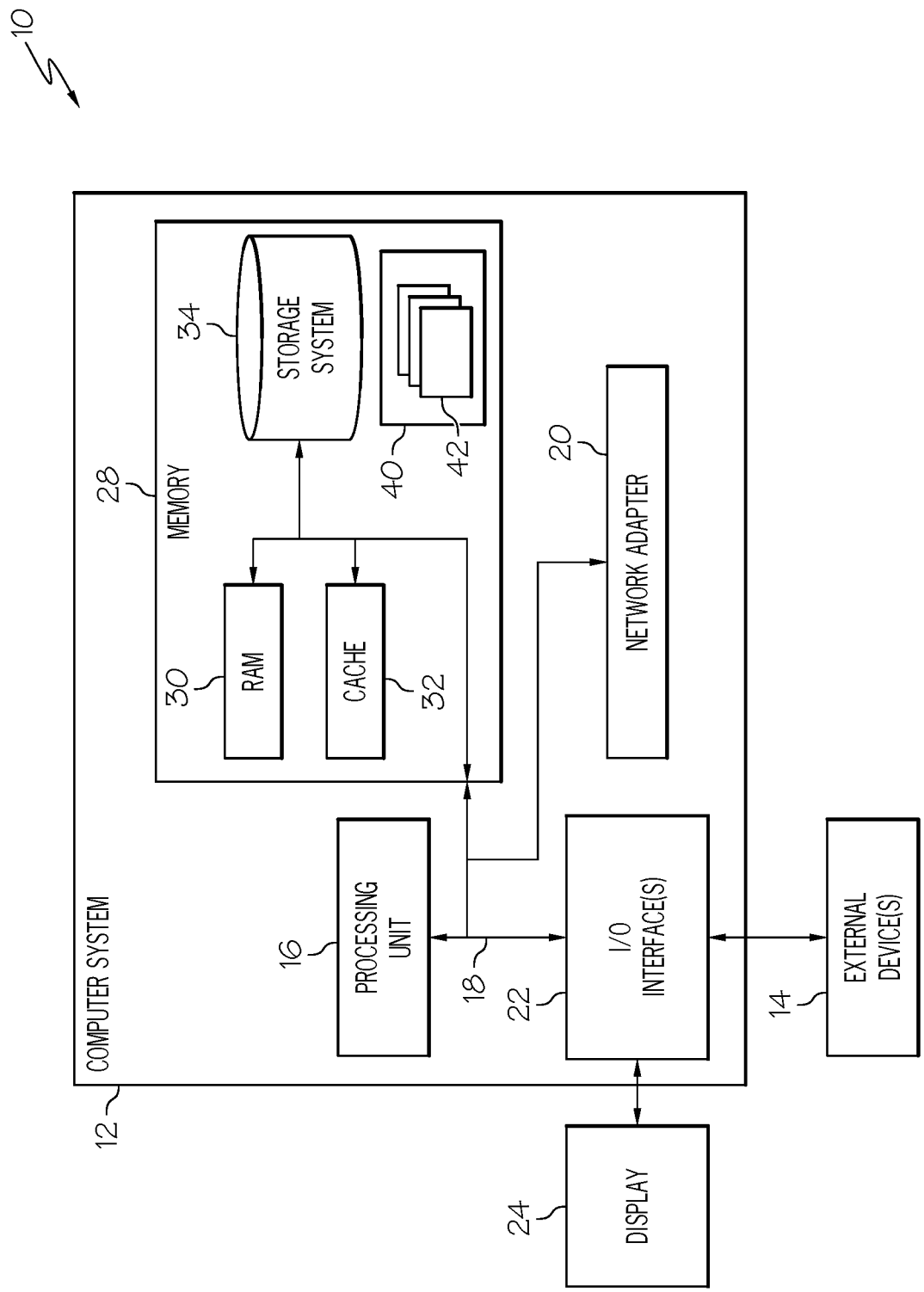
FIG. 1 shows an architecture in which the invention can be implemented according to an embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising" and the like, or "includes" and/or "including" and the like, when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the actions and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide a solution for optimizing a compiling of program code. A proposed state pointer, which corresponds to a current state pointer to a current state node that represents a section of the program code, is added in an intermediate language (IL) representation of the program code. When the optimizing compiler determines that an optimization should be made to a section of code, the current state node is copied to create a proposed state node, which is then referenced by the proposed state pointer. The proposed state node is edited to include the optimization while the current state node remains unchanged. The success of the optimization is evaluated, and an updated IL representation is generated in which any references to nodes that are no longer included in the flow of the former IL representation are removed.

Referring now to FIG. 1, a computerized implementation 10 for optimizing a compiling of program code will be shown and described according to an embodiment. Computerized implementation 10 is only one example of a suitable implementation and is not intended to suggest any limitation as to the scope of use or functionality of embodiments of the invention described herein. Regardless, computerized implementation 10 is capable of implementing and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can include addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for optimizing a compiling of program code. It should be understood that any other computers implemented under the present invention may have different components/software, but can perform similar functions. Computer system 12, as noted above in a non-limiting example, may be a server.

Computer system 12 in computerized implementation 10 is shown in the form of a general-purpose computing device. The components of computer system 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing a compiling of program code, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and/or program data. Each of the operating system, one or more application programs, other program modules, program data and/or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
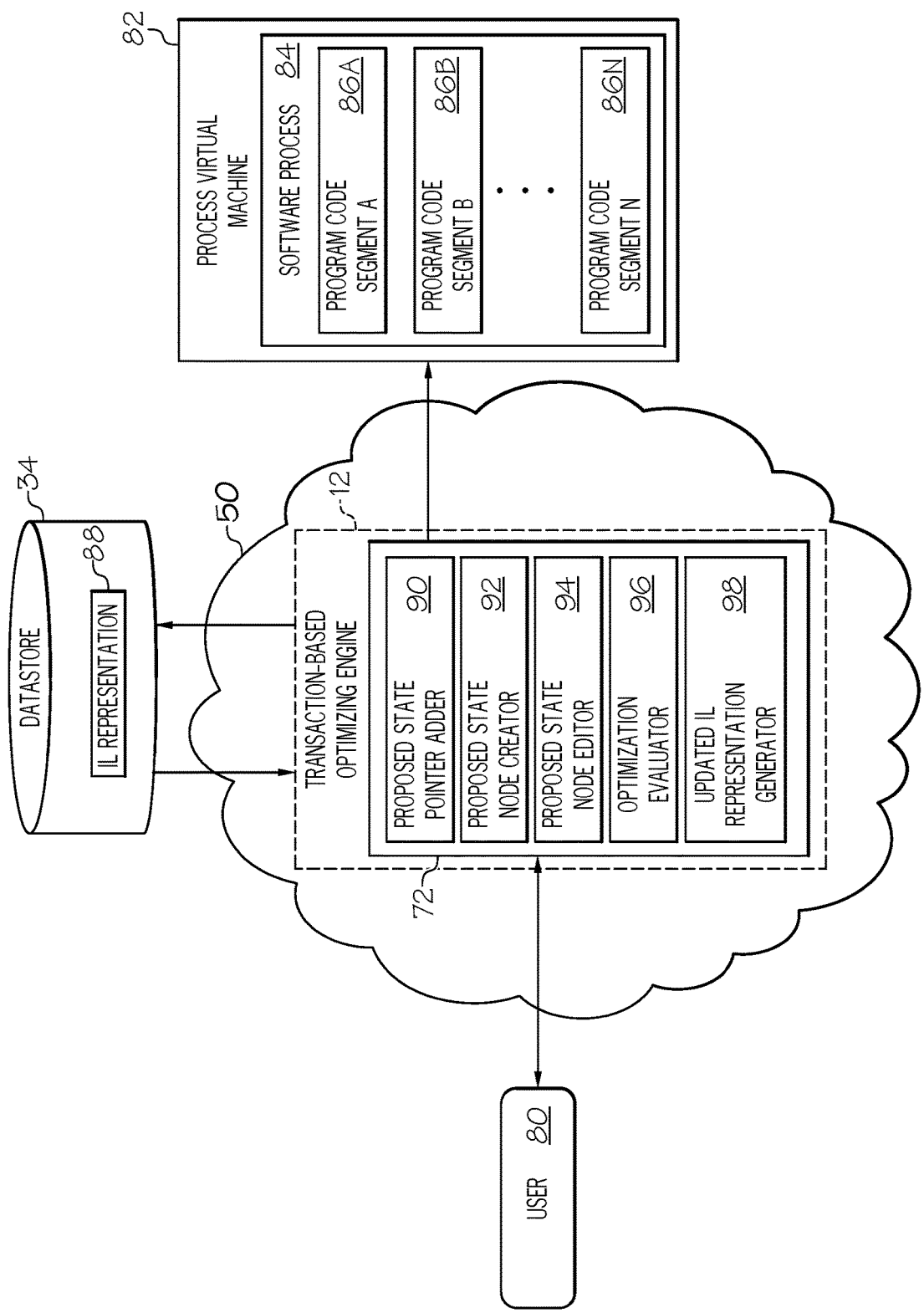
FIG. 2 shows a system diagram according to an embodiment of the present invention.

Referring now to FIG. 2, a system diagram describing the functionality discussed herein according to an embodiment of the present invention is shown. It is understood that the teachings recited herein may be practiced within any type of computing environment, including, but not limited to a networked computing environment 50 (e.g., a cloud computing environment). A stand-alone computer system/server 12 is shown in FIG. 2 for illustrative purposes only. In the event the teachings recited herein are practiced in a networked computing environment 50, each client need not have a transaction-based optimizing engine (hereinafter "system 72"). Rather, all or part of system 72 could be loaded on a server or server-capable device that communicates (e.g., wirelessly) with the clients to provide transaction-based optimization therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to the compiling of program code 86A-N in a networked computing environment. Such other system(s) have not been shown in FIG. 2 for brevity purposes.

Along these lines, system 72 may perform multiple functions similar to a general-purpose computer. Specifically, among other functions, system 72 can optimize a compiling (e.g., by a user 80) of program code (e.g., having program code segments 86A-N in a software process 84) in networked computing environment 50. To accomplish this, system 72 can include: a proposed state pointer adder 90, a proposed state node creator 92, a proposed state node editor 94, an optimization evaluator 96, and an updated IL representation generator 98. In any event, the technical effect of system 72 is to provide processing instructions to computer system/server 12 in order to perform a transaction-based optimized compiling of program code.

Figure 3A:
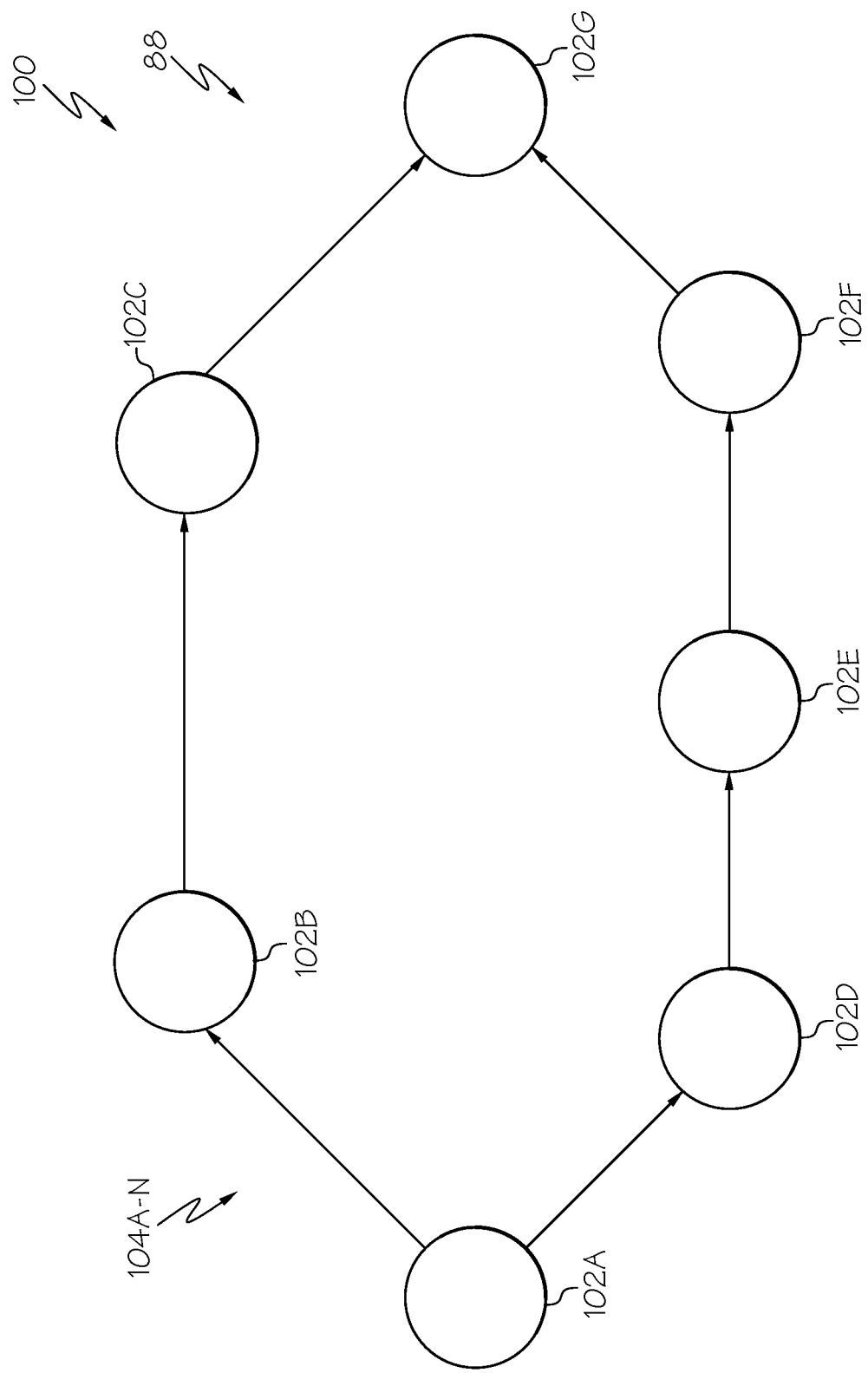
FIGS. 3A-B show example diagrams illustrating adding proposed state pointers to an intermediate language (IL) representation according to an embodiment of the present invention.

Referring now to FIG. 3A, an example diagram 100 showing an adding of proposed state pointers to intermediate language (IL) representation 88 (FIG. 2) according to an embodiment of the present invention is shown. Referring additionally to FIG. 2, IL representation 88 is a representation of program code that is generated by the compiler in order to facilitate the optimization process. The program code represented by IL representation 88 may represent one or more program code segments 86A-N of or an entirety of a software process 84. To this extent, software process 84 can be written a functional language (e.g., Idris, QML, Owl Lisp, etc.), an imperative (non-functional) language (e.g., C, C++, Java, Python, Ruby, and/or the like), or any other type of computer language now known or later developed. In an embodiment, software process 84 may be a process that is designed to be executed by a process virtual machine 82 (e.g., a Java Virtual Machine). In any case, the compiling of software process 84 may be performed statically or at run time (e.g., by a Just in Time (JIT) compiler).

In any case, as illustrated, IL representation 88 is shown in the format of a graph. In this illustration, IL representation 88 includes a set of current state nodes 102A-G (generically 102N). Each current state node 102N in set of current state nodes 102A-G represents a functional process performed by a particular program code segment 86N of software process 84. Further, a set of pointers 104A-N (generically 104N) link the set of current state nodes 102A-G, indicating the flow of program segments 86A-N within software process 84.

The inventors of the invention described herein have discovered certain deficiencies in the current solutions for optimizing the compiling of program code. For example, sometimes during an optimization pass over IL representation 88, a condition may occur that causes the compilation to fail. When such a failure occurs on an optimization pass, the compiler may have no choice but to fail the compile. This can be particularly problematic for a Just in Time (JIT) compiler that exists in Dynamic Language Runtimes, such as process virtual machine 82. A JIT compile could fail for several reasons including, but not limited to: because the compiler ran out of its memory budget, because the assumptions about the Class Hierarchy are no longer valid, because of excessive complexity, etc.

In any case, in current optimizing compiling solutions, when such a failure occurs, the compiler must throw away the current compile of the entire software process 84 and either interpret the software process 84 one instruction at a time (with all of the inefficiencies inherent therein) or retry the compile with fewer optimizations. However, as discovered by the inventors of the present invention, some failures, such as excessive complexity, are not caused by changes to the Runtime Environment and so do not necessarily require failure of the entire compile. Instead, these failures may only require the current optimization pass (e.g., of a certain section of software process 84) to be aborted.

The current invention provides a way to abort an optimization pass without failing the entire compile by effectively wrapping each optimization pass in a transaction. To accomplish this, the current invention changes the way an IL representation 88 graph is represented and imposes constraints on how it is modified in order to implement the basic concepts of an "abort" and a "commit". As such, the approaches described herein contain numerous advantages over present solutions. For example, the fact that the current state nodes 102A-G remain unchanged until the chance of failure is eliminated introduces an atomicity to the compiling operation that is found in transactional operations. This allows one transaction (e.g., portion of the compile) that has failed to be backed out while maintaining the optimizations that did not contribute to the failure. This allows the optimization to complete with fewer passes, improving the operation of the computer by saving time and resources in the optimization process and ensuring that more software processes 84 can be optimized.

Figure 3B:
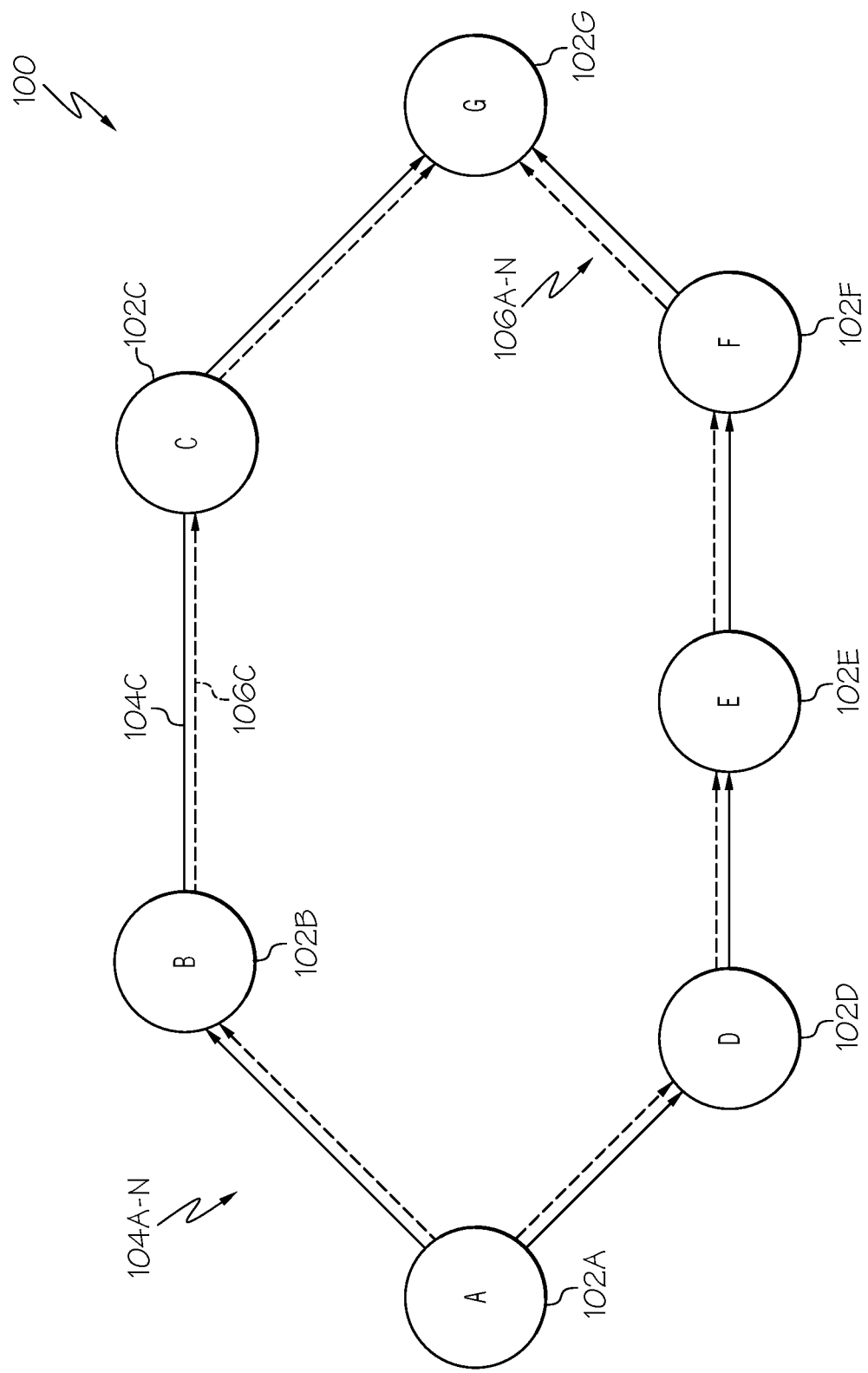

Referring now to FIG. 3B, example intermediate language (IL) representation 88 that has been updated according to an embodiment of the present invention is shown. Referring additionally to FIG. 2, proposed state pointer adder 90 of system 72, as executed by computer system/server 12, is configured to add a proposed state pointer 106N to a current state node 102N that represents a program code section 86N in IL representation 88 of the program code (e.g., software process 84). To this extent, proposed state pointer adder 90 can create additional proposed state pointers 106A-N (generically 106N) corresponding to every pointer that is currently in IL representation 88. As such, when there is originally only a single pointer from one current state node to another, such as, for example, pointer 104C between current state node B 102B and current state node C 102C, a single pointer 106C is added. Similarly, when multiple pointers 104A-N emanate from one current state node 102N, such as the pointers to both current state node B 102B and current state node C 102C emanating from current state node A 102A, a proposed state pointer 106N will be added for each of the original pointers 104N. This modification on every current state node 102N ensures that instead of having one pointer 104N per child, each current state node 102N will have two pointers 104N, 106N per child. The idea is that the original pointer 104N represents the state before the optimization started (current state) while the added pointer 106N represents the state during the optimization (proposed state). In any case, the added proposed state pointers 106A-N can be made to point to the same current state node 102A-N as the original pointers 104A-N. Alternatively, proposed state pointers 106A-N can be made to point to a null node, a temporary node, or any other location that is desirable.

Once the proposed state pointers 106A-N have been added, the compiler can begin its optimizing passes in compiling the program code (e.g., software process 84). However, unlike in current solutions, the optimizer of the present invention does not make any changes to any current state node 102A-N in IL representation 88 directly. In contrast, the present invention introduces a constraint on every current state node 102N in the IL representation 88 graph that current state node 102N needs to be externally immutable. To this extent, current state node 102N is not modified directly (for example using a pointer, modifying the content of the node directly, etc.), but only via Application Program Interfaces (APIs). In addition, the APIs will respect the immutability of current state node 102N and will only make changes to the proposed state pointers 106A-N until such time as it has been determined whether the transaction (optimization pass) has completed successfully.

Figure 4A:
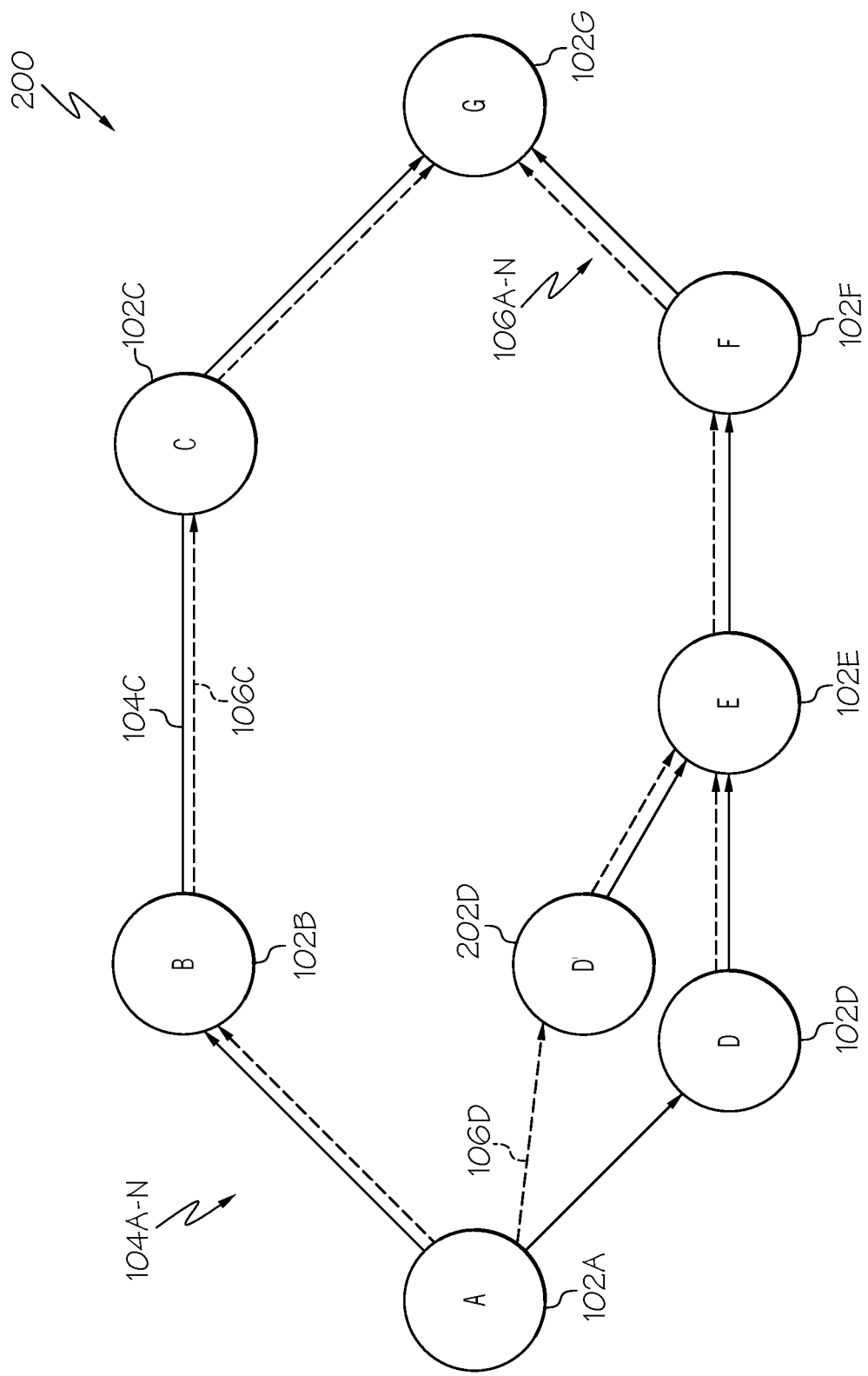
FIG. 4A-C show an example optimization pass of an IL representation according to an embodiment of the present invention.
Figure 4B:
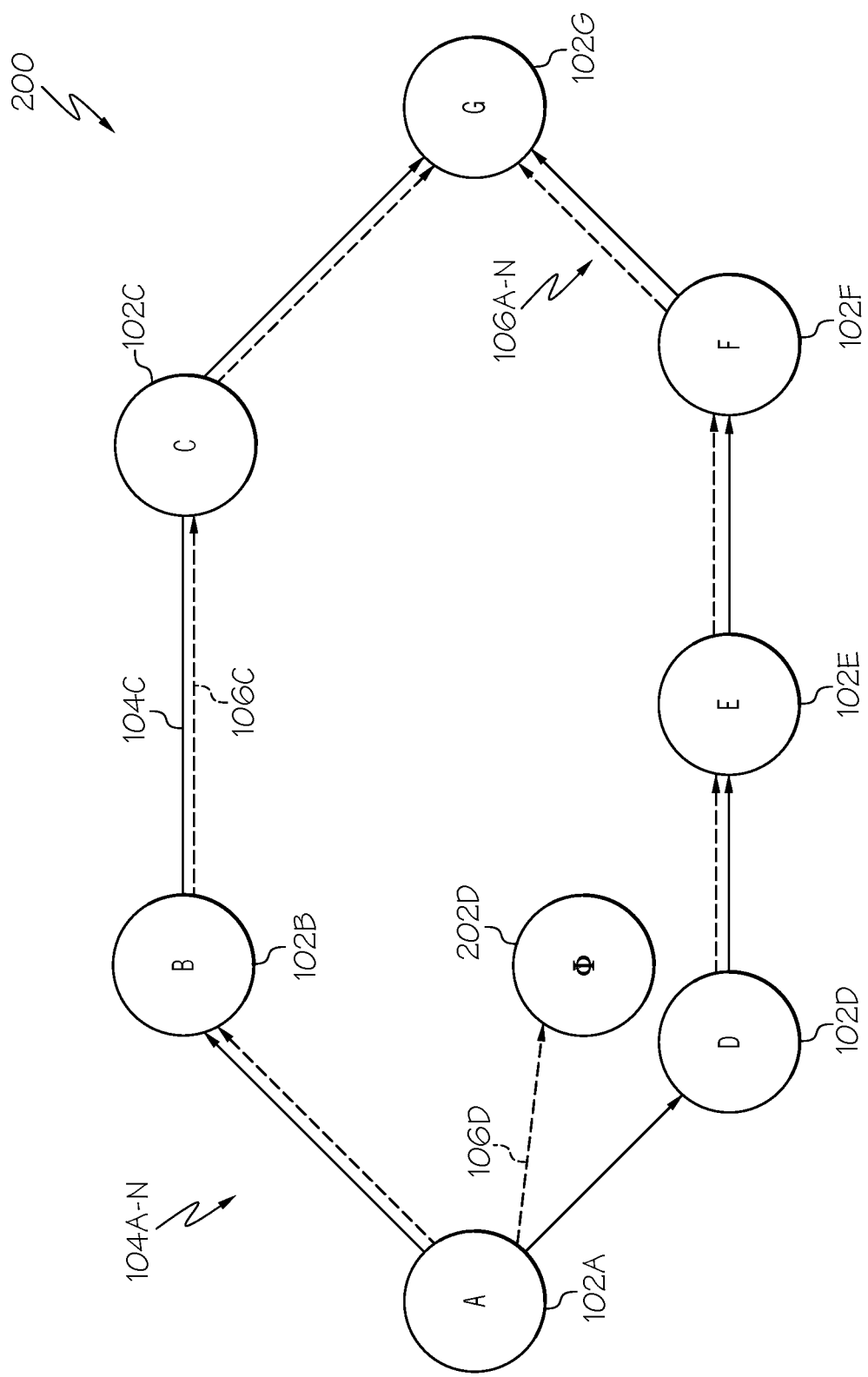
Figure 4C:
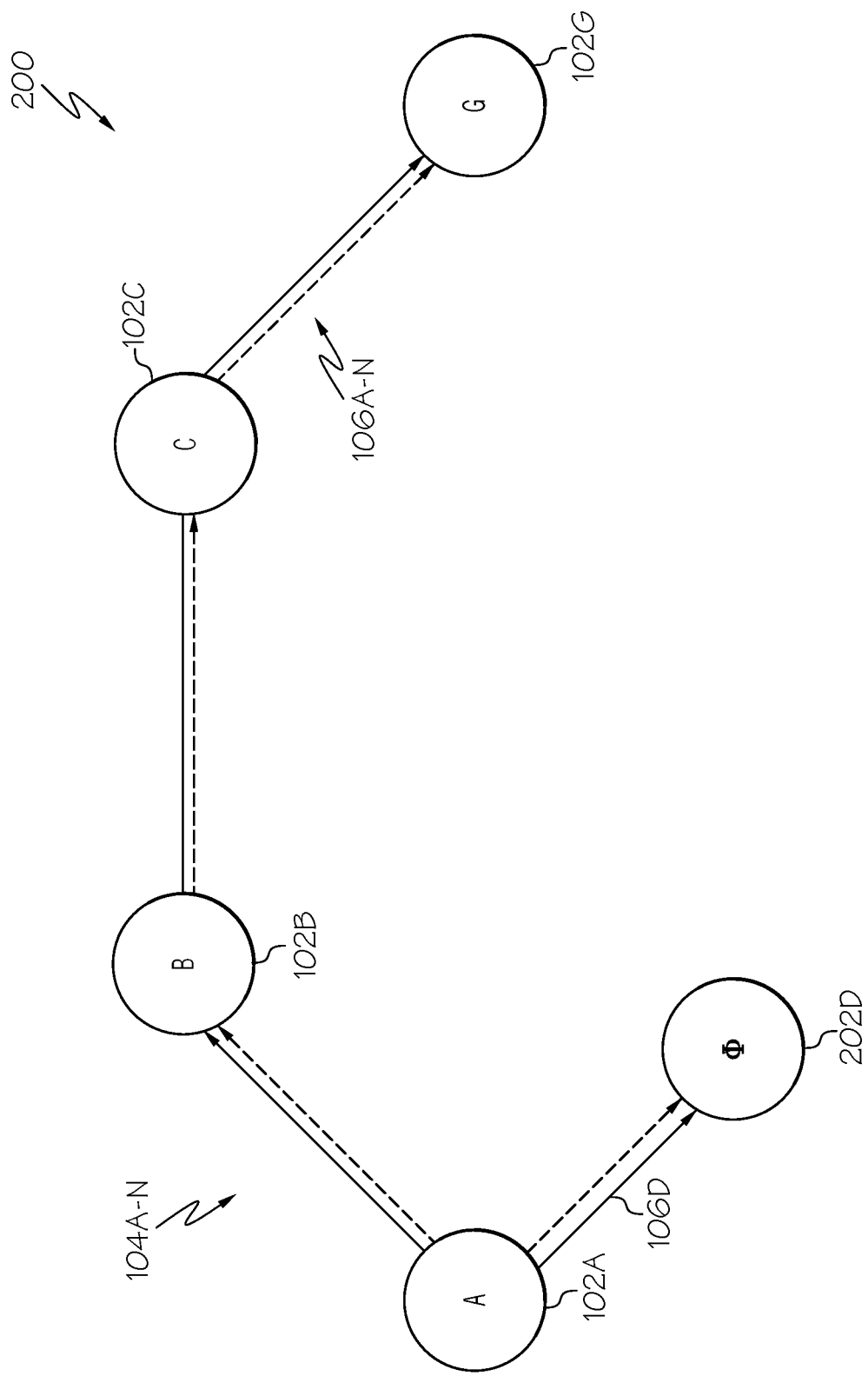

Referring now to FIG. 4A-C, an example optimization pass 200 of IL representation 88 is shown according to an embodiment of the present invention. Referring additionally to FIG. 2, proposed state node creator 92 of system 72, as executed by computer system/server 12, is configured to create a proposed state node (generically 202N) that is referenced by proposed state pointer 106D. Specifically, as the optimizing compiler (e.g., of a JIT compiler) is performing its optimization passes, it may make a determination that a particular program code segment 86N is to be optimized. In response to such a determination, proposed state node creator 92 creates a copy of the current state node 102N in IL representation 88 that represents the program code section 86N in software process 84 that is to be optimized. Thus, proposed state node 202N that is created is an exact duplicate of current state node 102N, with identical code, metadata, referential pointers, etc.) Once the proposed state node 202N has been created, the proposed state pointer 104N of the parent node can be updated to point to the new proposed state node 202N. In an embodiment, a reference to the current state node 102N is added to a list, and an API to update the proposed state pointer 104N of the parent node can be called to change the pointer target to proposed state node 202N.

For example, assume that the optimizer has determined that the branch from current state node 102A to current state node D 102D in FIGS. 4A-C is never taken. Proposed state node creator 92 makes a copy of current state node D 102D, creating proposed state node D' 202D, which is a duplicate of current state node D 102D. Proposed state node creator 92 then redirects proposed state pointer 106D to point to proposed state node D' 202D.

Proposed state node editor 94 of system 72, as executed by computer system/server 12, is configured to edit proposed state node 202N to include the optimization determined by the optimizing compiler. This optimization can include changes to code, pointers, references, metadata, etc., of proposed state node 202N. However, as stated above, no changes are made to current state node 102N. Rather, current state node 102N remains unchanged. Further, it should be understood that the editing performed by proposed state node editor 94 could be performed in conjunction with the creation of proposed state node 202N created by proposed state node creator 92, such that the proposed state node 202N is created as a copy of current state node 102N with a single change. Thus, the immutability of proposed state node 202N can be preserved as well, with any changes being made via the creation and editing of a new proposed state node (not shown) based on the proposed state node 202N. In any case, optimization pass 200 of FIG. 4B reflects edits that have been made to proposed state node 202D. Specifically, as shown, proposed state node 202D has been edited to change proposed state node 202D to a NULL node and to remove the pointer to current state node E 102E, in order to accomplish the optimization.

Optimization evaluator 96 of system 72, as executed by computer system/server 12, is configured to evaluate whether the optimization is successful. To this extent, the optimizing compiler (e.g., JIT compiler) monitors the optimization pass to determine whether any errors have occurred in the optimization pass. If no errors have occurred, the optimization pass is evaluated as being successful. Otherwise, the optimization pass is evaluated as having failed.

Updated IL representation generator 98 of system 72, as executed by computer system/server 12, is configured to create an updated IL representation 88N based on the result of the evaluating done by optimization evaluator 96. This is done by removing references to nodes that will not be part of the final compile and, as such, are no longer part of the IL representation 88. To accomplish this, updated IL representation generator 98 can traverse all of the nodes in/of IL representation 88 and set the current state pointer 104N of each parent node to reference the appropriate node based on the result of the evaluating (e.g., the proposed state node 202N if the optimization pass was successful or the current state node 102N if the pass was not).

To this extent, in response to an evaluation that indicates that the optimization has succeeded, updated IL representation generator 98 can remove references to the current state node 102N. Additionally, for memory purposes, any current state nodes 102A-N that are no longer a part of IL representation 88 (along with, in some embodiments, any references, metadata, pointers, etc., that are no longer being used by the current state nodes 102A-N) can be collected (e.g., removed from the IL representation 88) to be freed or to be added to a node pool for later use. This effectively "commits" the optimization.

Alternatively, in response to an evaluation that indicates that the optimization has failed, updated IL representation generator 98 can remove references to the proposed state node 202N. Additionally, for memory purposes, any proposed state nodes 202N that are no longer a part of IL representation 88 (along with, in some embodiments, any references, metadata, symbols in the symbol table, pointers to the symbol table, other pointers, etc., that are no longer being used by the proposed state nodes 202N) can be collected up (e.g., removed from the IL representation 88) to be freed or to be added to a node pool for later use. Updated IL representation generator 98 can remove references to the proposed state node 202N. Additionally, for memory purposes, any proposed state nodes 202N that are no longer a part of IL representation 88 (along with, in some embodiments, any references, metadata, pointers, etc., that are no longer being used by the proposed state nodes 202N) can be collected (e.g., removed from the IL representation 88) to be freed or to be added to a node pool for later use. Further, any nodes that depend from the removed node that were not originally part of IL representation 88 can also be removed. This effectively "aborts" the optimization pass.

To this extent, in optimization pass 200 of FIG. 4C, optimization evaluator 96 has evaluated the optimization pass as being successful. Accordingly, proposed state pointer 106D (FIG. 4A) has been converted into a current state pointer 106D by making the current state pointer of 102A equal to the proposed state pointer 106D. Further, current state node D 102D has been removed from IL representation 88. Still further, current state node E 102E and current state node F 102F, along with their accompanying current state pointers 104A-N and proposed state pointers 106A-N have been removed from IL representation 88 as well.

Figure 5A:
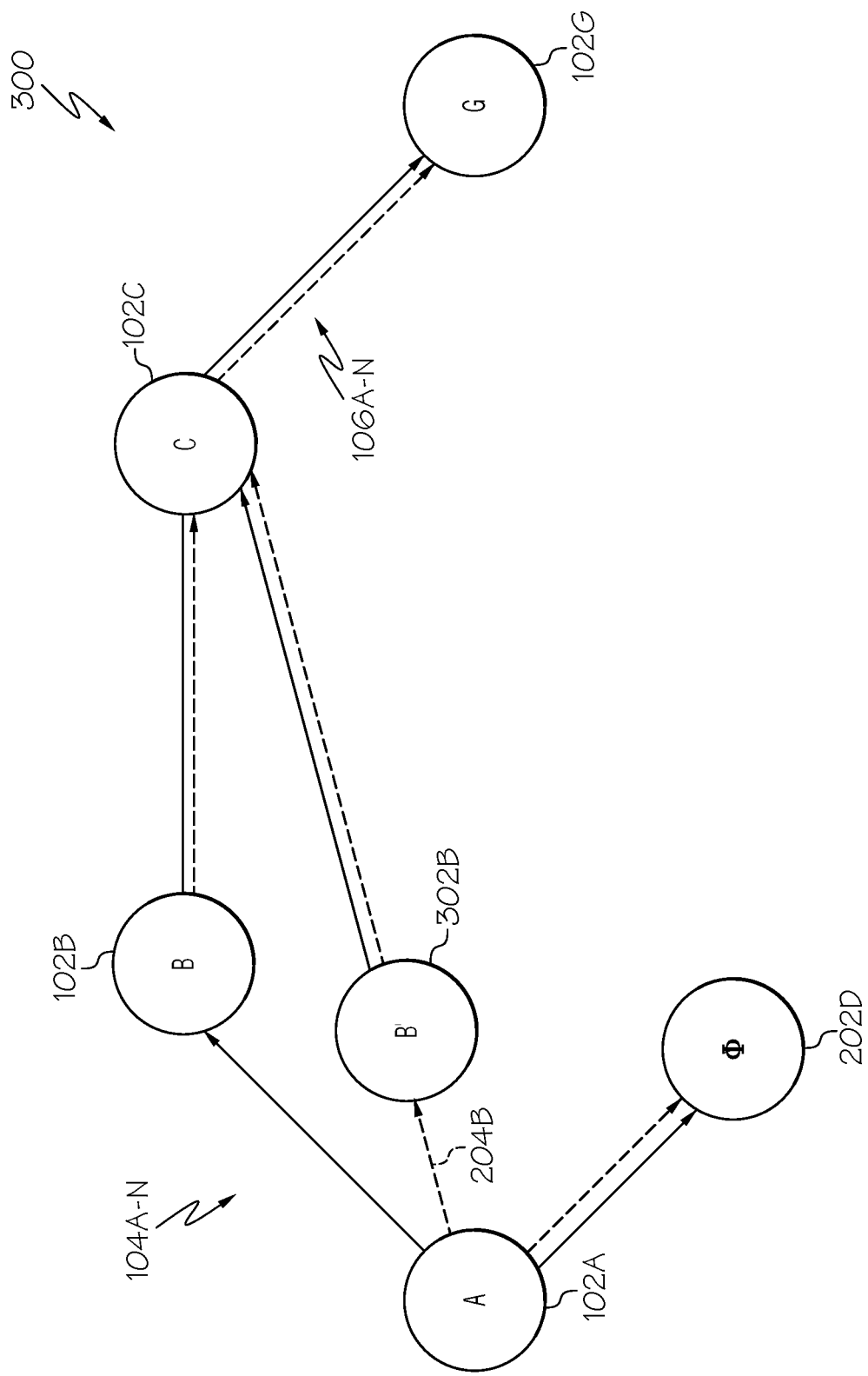
FIGS. 5A-C show an example optimization pass of an IL representation according to an embodiment of the present invention.
Figure 5B:
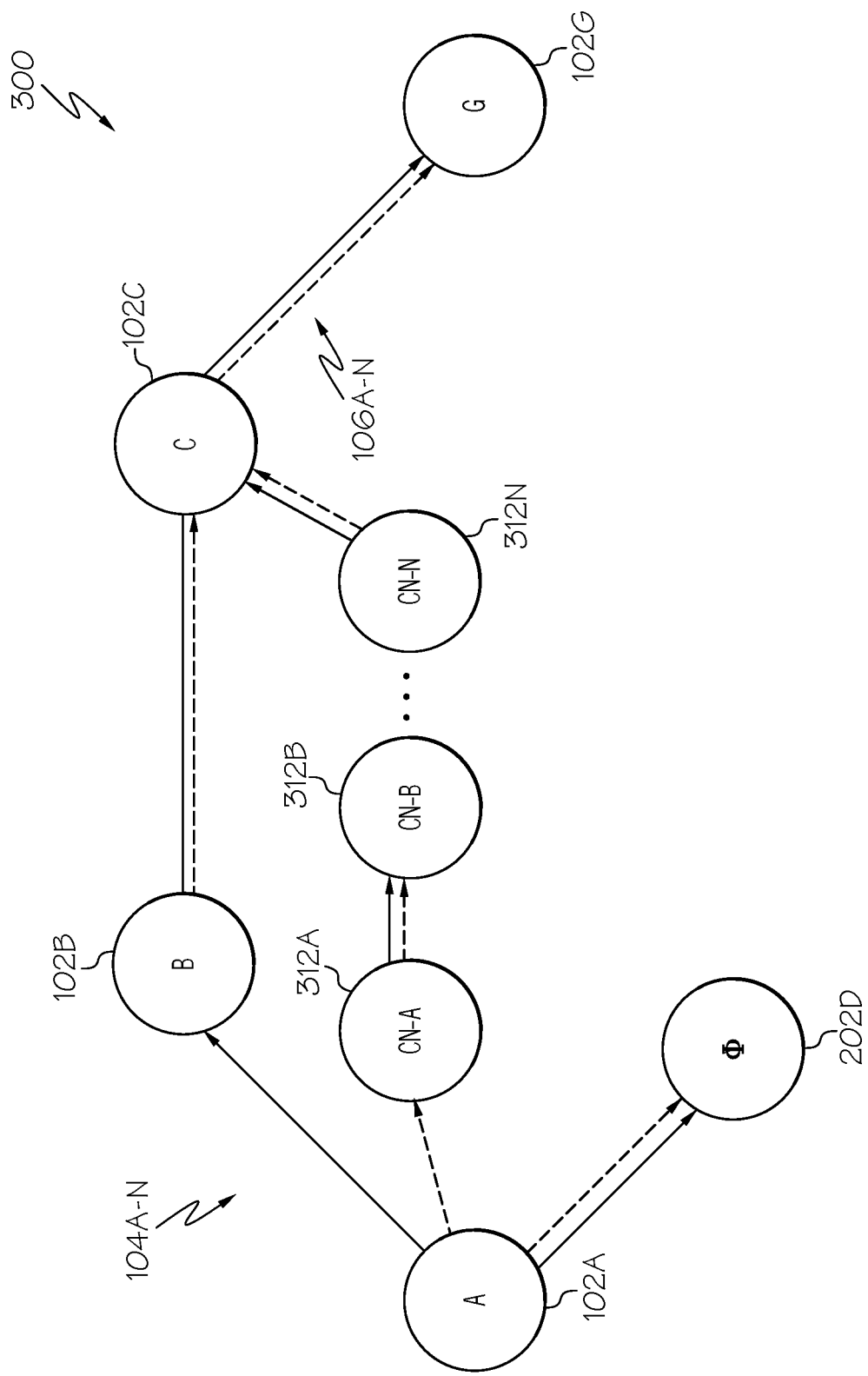
Figure 5C:
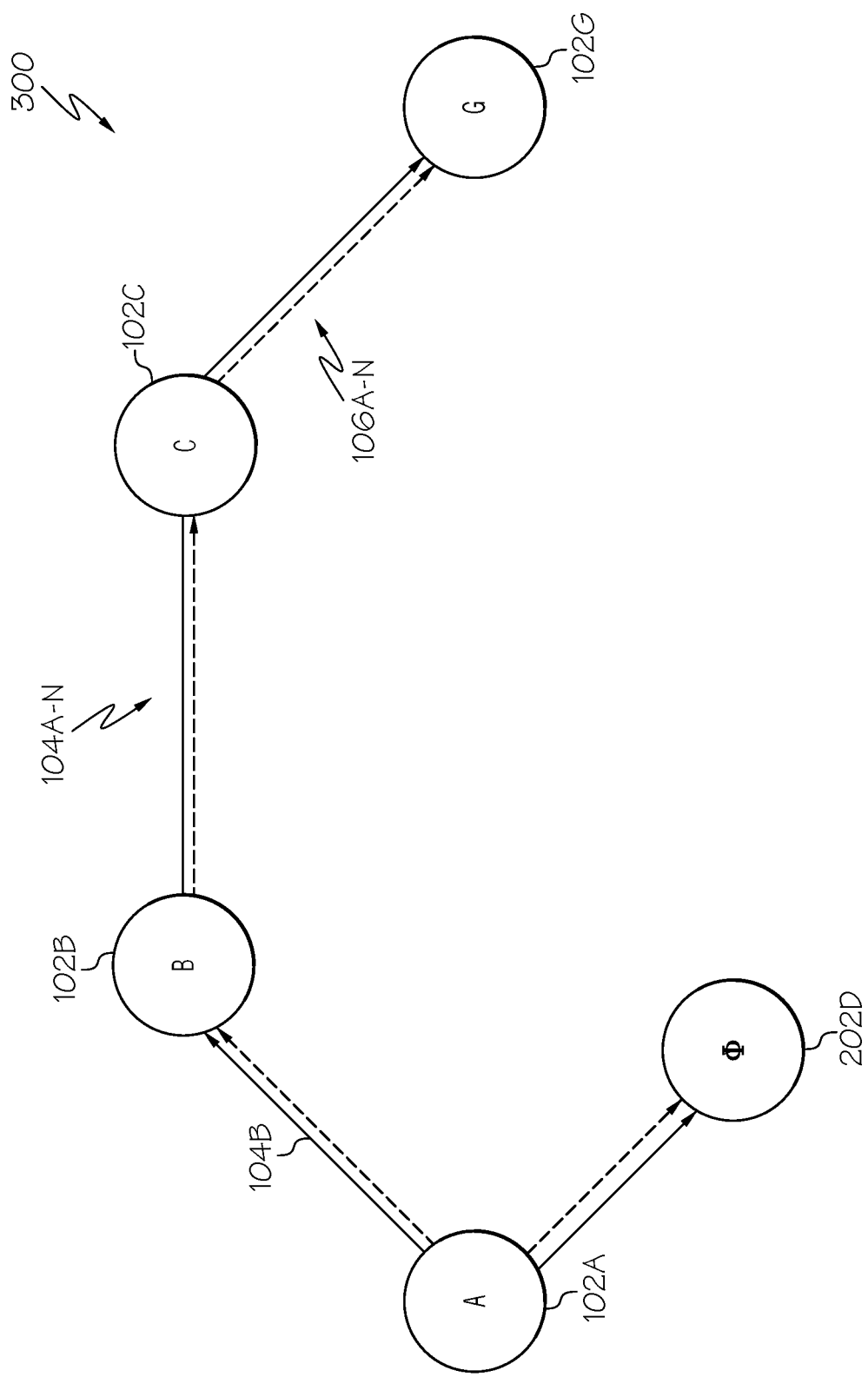

Referring now to FIG. 5A-C, another example optimization pass 300 of IL representation 88 is shown according to an embodiment of the present invention. As shown, example optimization pass 300 is being performed subsequent to the optimization pass 200 of FIGS. 4A-C having been committed. Assume that in this optimization pass, the optimizer has determined that current state node 102B is a call to an external library and that the process being called should be brought inline for optimization purposes. Proposed state node creator 92 makes a copy of current state node B 102B, creating proposed state node B' 302B, which is a duplicate of current state node B 102B. Proposed state node creator 92 then redirects proposed state pointer 204B to point to proposed state node B' 302B.

Next, in FIG. 5B, optimization pass 300 includes IL representation 88 that reflects edits that have been made to proposed state node 302B by proposed state node editor 94. Specifically, as shown, proposed state node 302B (FIG. 4A) has been edited to change proposed state node 302B to the first called node (CN-A 312A) in the called process. Further, proposed state node editor 94 has attempted to insert the remainder of the nodes in the called process (CN-B 312B through CN-N 312N) inline between proposed state node 302A and current state node 102C.

Assume that in optimization pass 30 of FIG. 5C, optimization evaluator 96 has evaluated the optimization pass as having failed (e.g., because the compiler has exceeded its memory allocation). In response, proposed state pointer 204B (FIG. 5A) has been made equal to the current state pointer 104B, leaving current state pointer 104B still pointing to current state node 102B. Further, proposed state nodes CN-A through CN-N 312A-N have been removed from IL representation 88, along with their accompanying pointers.

In any case, once all of the optimization passes have completed and have either been committed or aborted, the program code can be compiled based on the updated IL representation. Once compiled, the program code can be executed (e.g., as software process 84 by process virtual machine 82).

Figure 6:
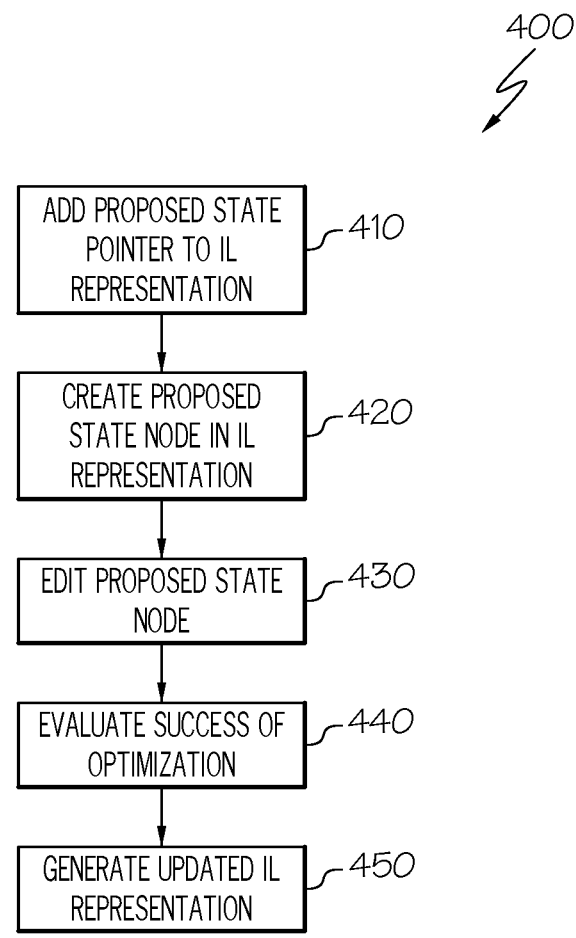
FIG. 6 shows an example process flowchart according to an embodiment of the present invention.

Referring now to FIG. 6 in conjunction with FIG. 2, a method flowchart 400 according to an embodiment of the present invention is shown. At 410, proposed state pointer adder 90 of system 72, as executed by computer system/server 12, adds to IL representation 88 proposed state pointer 106N (FIG. 3B) corresponding to current state pointer 104N to current state node 102N. Current state node 120N represents a segment 86N of program code in IL representation 88. At 420, proposed state node creator 92 of system 72, as executed by computer system/server 12, creates proposed state node 202D (FIG. 4A) that is referenced by proposed state pointer 106D. Proposed state node 202D (FIG. 4A) is created in response to a determination by optimizing compiler to make an optimization to segment 86N of program code and is a copy of current state node 102D. At 430, proposed state node editor 94 edits proposed state node 202D (FIG. 4A) to include the optimization. This editing is performed without changing current state node 102D (FIG. 4A). At 440, optimization evaluator 96 of system 72, as executed by computer system/server 12, evaluates whether the optimization is successful. At 450, updated IL representation generator 98 of system 72, as executed by computer system/server 12, removes references to nodes that are no longer in IL representation 88 based on the evaluating to get an updated IL representation 88.

Process flowchart 400 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit including custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, include one or more physical or logical blocks of computer instructions, which may, for instance, be organized as an object, procedure, or function. Nevertheless, the executables of an identified system or unit need not be physically located together, but may include disparate instructions stored in different locations which, when joined logically together, include the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a compiling of program code. Thus, embodiments herein disclose a process for supporting computer infrastructure, including integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing a compiling of program code. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands including words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a hardware storage device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to optimize a compiling of program code. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a compiling of program code, comprising:
   adding a proposed state pointer corresponding to a current state pointer to a current state node that represents a section of the program code in an intermediate language (IL) representation of the program code;
   creating, in response to a determination by an optimizing compiler to make an optimization to the section of code, a proposed state node that is referenced by the proposed state pointer, the proposed state node being a copy of the current state node;
   editing the proposed state node to include the optimization, wherein the current state node remains unchanged;
   evaluating whether the optimization is successful; and
   removing, based on the evaluating, references to nodes that are no longer in the IL representation to get an updated IL representation, the removing further comprising:
   removing references to the current state node in response to an evaluation that indicates that the optimization has succeeded; and
   removing the current state node in response to an evaluation that indicates that the optimization has succeeded.

2. The method of claim 1, further comprising compiling the program code based on the updated IL representation.

3. The method of claim 1,
   wherein the program code is part of a process that is designed to be executed by a process virtual machine;
   wherein the compiling is performed at run time by a just in time (JIT) compiler.

4. The method of claim 3, further comprising generating the IL representation of the process by the JIT compiler.

5. The method of claim 1, the removing further comprising:
   removing references to the proposed state node in response to an evaluation that indicates that the optimization has failed; and
   removing the proposed state node in response to an evaluation that indicates that the optimization has failed.

6. The method of claim 5, the removing further comprising removing all nodes that were not part of the IL representation that depend from the current state node.

7. The method of claim 1, the removing further comprising removing all nodes that were not part of the IL representation that depend from the proposed state node.

8. A computer system for optimizing a compiling of program code, the computer system comprising:
   a memory medium comprising instructions;
   a bus coupled to the memory medium; and
   a processor coupled to the bus that when executing the instructions causes the system to:
   add a proposed state pointer corresponding to a current state pointer to a current state node that represents a section of the program code in an intermediate language (IL) representation of the program code;
   create, in response to a determination by an optimizing compiler to make an optimization to the section of code, a proposed state node that is referenced by the proposed state pointer, the proposed state node being a copy of the current state node;
   edit the proposed state node to include the optimization, wherein the current state node remains unchanged;
   evaluate whether the optimization is successful; and
   remove references to nodes that are no longer in the IL representation based on the evaluating to get an updated IL representation, including:
   removing references to the current state node in response to an evaluation that indicates that the optimization has succeeded; and
   removing the current state node in response to an evaluation that indicates that the optimization has succeeded.

9. The computer system of claim 8, the instructions further causing the system to compile the program code based on the updated IL representation.

10. The computer system of claim 8, further comprising:
    a process virtual machine; and
    a just in time (JIT) compiler;
    wherein the program code is part of a process that is designed to be executed by the process virtual machine;
    wherein the compiling is performed at run time by the JIT compiler.

11. The computer system of claim 10, the instructions further causing the system to generate the IL representation of the process using the JIT compiler.

12. The computer system of claim 8, the instructions causing the system to remove further causing the system to:
   remove references to the proposed state node in response to an evaluation that indicates that the optimization has failed; and
   remove the proposed state node in response to an evaluation that indicates that the optimization has failed.

13. The computer system of claim 12, the instructions causing the system to remove further causing the system to remove all nodes that were not part of the IL representation that depend from the proposed state node.

14. The computer system of claim 8, the instructions causing the system to remove further causing the system to remove all nodes that were not part of the IL representation that depend from the current state node.

15. A computer program product for optimizing a compiling of program code, the computer program product comprising a computer readable hardware device, and program instructions stored on the computer readable hardware device, to:
   add a proposed state pointer corresponding to a current state pointer to a current state node that represents a section of the program code in an intermediate language (IL) representation of the program code;
   create, in response to a determination by an optimizing compiler to make an optimization to the section of code, a proposed state node that is referenced by the proposed state pointer, the proposed state node being a copy of the current state node;
   edit the proposed state node to include the optimization, wherein the current state node remains unchanged;
   evaluate whether the optimization is successful; and
   remove references to nodes that are no longer in the IL representation based on the evaluating to get an updated IL representation, including:
      removing references to the current state node in response to an evaluation that indicates that the optimization has succeeded; and
      removing the current state node in response to an evaluation that indicates that the optimization has succeeded.

16. The computer program product of claim 15, the computer readable hardware device further comprising instructions to compile the program code based on the updated IL representation.

17. The computer program product of claim 15,
   wherein the program code is part of a process that is designed to be executed by a process virtual machine;
   wherein the compiling is performed at run time by a just in time (JIT) compiler.

18. The computer program product of claim 17, the computer readable hardware device further comprising instructions to generate the IL representation of the process using the JIT compiler.

19. The computer program product of claim 15, the instructions stored on the computer readable hardware device to remove further comprising instructions to:
   remove references to the proposed state node in response to an evaluation that indicates that the optimization has failed;
   remove the proposed state node in response to an evaluation that indicates that the optimization has failed.

20. The computer program product of claim 19, the instructions stored on the computer readable hardware device to remove further comprising instructions to:
   remove all nodes that were not part of the IL representation that depend from the proposed state node.

* * * * *